United States Patent [19]
Bromley

[11] Patent Number: 5,150,496
[45] Date of Patent: Sep. 29, 1992

[54] INTERNAL GRINDING AND CUTTING DEVICE FOR PIPE AND CASING

[75] Inventor: Scott Bromley, Lovington, N. Mex.

[73] Assignee: Scott Tech International, Inc., Lovington, N. Mex.

[21] Appl. No.: 739,377

[22] Filed: Aug. 2, 1991

Related U.S. Application Data

[63] Continuation-in-part of Ser. No. 575,263, Aug. 30, 1990, Pat. No. 5,062,187, which is a continuation-in-part of Ser. No. 413,540, Sep. 7, 1989, Pat. No. 4,954,023.

[51] Int. Cl.⁵ .................................. B23B 47/00
[52] U.S. Cl. ........................ 29/33 T; 408/1 R; 408/79; 51/34 J
[58] Field of Search ............ 408/1 R, 57, 59, 75, 408/79, 80–83; 409/143; 29/33 T; 51/34R, 34 J, 245, 290, 349

[56] References Cited

U.S. PATENT DOCUMENTS

| | | | |
|---|---|---|---|
| 3,348,434 | 10/1967 | Plummer | 408/83 |
| 3,389,621 | 6/1968 | Wear | 408/83 |
| 4,084,484 | 4/1978 | Shklyanov et al. | 409/143 X |
| 4,842,452 | 6/1989 | Strait | 408/80 |

FOREIGN PATENT DOCUMENTS 2211446  7/1989  United Kingdom ............... 409/143

*Primary Examiner*—Eugene F. Desmond
*Attorney, Agent, or Firm*—Marcus L. Bates

[57] ABSTRACT

A portable system for reworking the inside diameter of oil field pipe and casing, and especially plastic coated pipe that is to be re-coated. The system includes a grinderhead that removes irregularities from the inner surface of the pipe to render the pipe suitable for use in deep wells. A cutterhead assembly is rotated as it is forced into the interior of a joint of pipe. The cutterhead assembly includes a mandrel which turns a special cutting device having a plurality of grinders for engaging and cutting the inner wall of the pipe as the entire grinderhead is forced to travel through the pipe. Alignment and grinding members attached to the mandrel maintain the longitudinal axis of the grinders in proper alignment to produce the desired new pipe inside diameter. Included in the system is a special cutterhead for removing old plastic coating material in advance of the grinderhead whereby the cutterhead mostly removes plastic while the grinderhead mostly removes metal from the inner pipe surface.

19 Claims, 2 Drawing Sheets

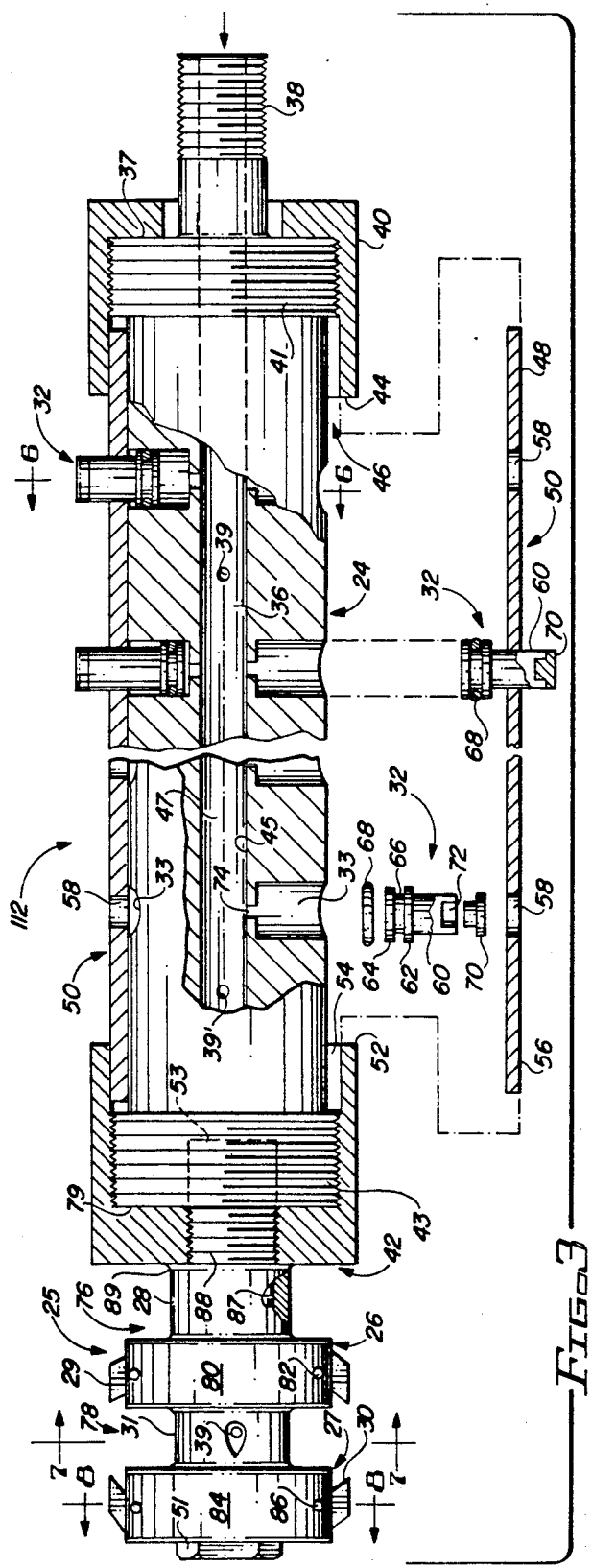
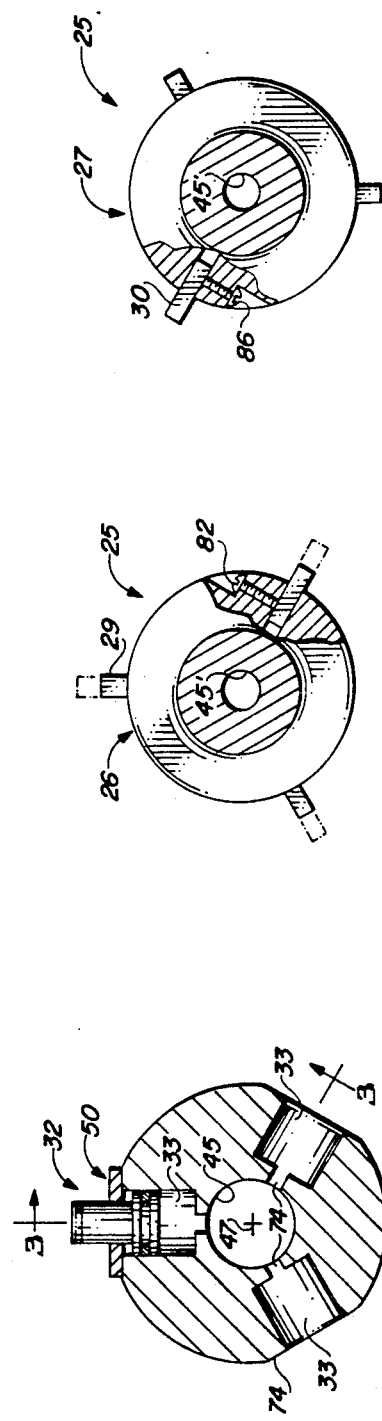

1

INTERNAL GRINDING AND CUTTING DEVICE FOR PIPE AND CASING

REFERENCE TO RELATED PATENT APPLICATIONS

This application is a continuation-in-part of patent application Ser. No. 07/575,263 filed Aug. 30, 1990 entitled "INTERNAL CUTTING HEAD FOR DRIFTING PIPE", now U.S. Pat. No. 5,062,187 issued Nov. 5, 1991; which in turn is a continuation-in-part of parent patent application Ser. No. 07/413,540 filed Sep. 7, 1989, entitled "INTERNAL CUTTING HEAD FOR DRIFTING PIPE", now U.S. Pat. No. 4,954,023 issued Sep. 4, 1990.

BACKGROUND OF THE INVENTION

Reference is made to my two above identified patents for further background of this invention, and to the art of record set forth therein.

Applicant has discovered that it is possible to connect a special shaft driven grinder device to a shaft, support the grinder device within a pipe while axially aligning the center of the grinder device respective to the longitudinal central axis of the pipe, and to reciprocate the grinder device along the length of the pipe while the grinder device is rotated by the shaft and thereby remove a plastic lining along with a small amount of the interior metal part of the pipe surface with precision and thereby provide the pipe with a uniform inside diameter that is cleaned of debris and therefore is ideal for receiving a coating of plastic material. In this disclosure, the terms pipe, casing, and pipe section are considered equivalent.

In the art of plastic coating the interior surface of joints or sections of pipe, it has been customary to re-use old plastic coated pipe joints by thoroughly cleaning the old pipe joints to remove the old plastic coating. This is accomplished by first firing them in a large oven to burn the old coating from the pipe interior. Then the pipe is cooled and the dirty pipe interior is sand blasted to remove all foreign substances and to expose uncontaminated metal along the entire length of the pipe to which the new coating will satisfactorily adhere. Next the pipe is coated using a known coating process. This usually requires heating the pipe above the melting point of the plastic and then the hot pipe interior is contacted with plastic powder which melts into a uniform coating. Several successful processes for powder coating are set forth in Gibson U.S. Pat. Nos. 4,089,998 and 4,420,508; to which reference is made for further background. There are many other Patents related to the plastic coating of pipe, such as those cited in the Gibson Patents.

Irregularities often randomly occur on the inside wall surface of pipe sections which preclude the pipe from being used in deep wells or for in a cross-country pipe line. This unacceptable pipe is referred to as "un-drifted pipe", or pipe that has an irregular interior diameter and therefore is too small to accept the drift throughout the length thereof. This un-drifted pipe usually is perfectly good except for these small excursions from ideal diameter. Because of the irregularities, the pipe cannot be used downhole since an oil company must be assured that the entire casing or string of pipe is of a minimum diameter to avoid the danger of subsequently sticking a tool string, or other device, downhole in the pipe or in the casing. A stuck object, called a fish, is usually considered a catastrophe in the oil field and requires an expensive fishing job in order to retrieve the fish from the borehole.

Moreover, many new pipe sections are rejected because of small, sharp, metallic imperfections which can protrude through a plastic coating to cause newly coated pipe to be rejected by quality control. The pipe section must then be processed all over again, just because of such small imperfections. Too many rejects can bankrupt a company, especially a company that must depend upon the old fashioned method of cleaning the used pipe. Hence, it is sometime advantageous to clean the inside surface of new pipe, as well as the used pipe, so as to avoid the probability of having to process the pipe a second time.

The E.P.A. (Everyone in the oil business is familiar with this term) dislikes contamination of our atmosphere with noxious gases, and especially those emitted from an oven during the processing of used pipe, wherein the plastic coating is combusted or burned from the interior of the pipe. This is considered wasteful, expensive, and a health hazard. Applicant has discovered that used plastic coated pipe can be economically reclaimed without the necessity of burning the coating in an oven. This is accomplished by running a special grinding tool, made in accordance with this invention, through the pipe interior to remove the old coating and to additionally prepare the interior metal surface of the pipe to receive the new plastic coating. The grinding tool, together with a considerable amount of support equipment, provides a method and apparatus for drifting and cleaning new or used pipe so that the expensive un-drifted pipe can be reclaimed and properly employed as drifted pipe that is free of imperfections. The savings in labor and equipment afforded by this invention are considerable, a complete heat cycle is avoided, there are no noxious gases released into the atmosphere, the sandblasting of the pipe interior can be omitted, and the removed plastic and metal can be recycled.

SUMMARY OF THE INVENTION

This invention comprehends both method and apparatus for removing material from the inner surface of pipe sections, including casing and other tubular plastic or metal sections, and especially for reclaiming new un-drifted or used plastic coated pipe. The pipe is reclaimed by the provision of a grinding tool that includes a grinderhead apparatus having a plurality of radially active alignment and grinding means spaced circumferentially and axially from one another and mounted to be rotated by a mandrel. The mandrel is rotated about the longitudinal central axis thereof.

The rotatable grinderhead apparatus removes a plastic coating and metal imperfections from the interior wall surface of a pipe section, and is mounted to be rotated by a shaft that drives the mandrel. The alignment and grinding means of the grinderhead apparatus includes a plurality of spaced piston receiving chambers formed within a mandrel within which a radially active piston is reciprocatingly received. The pistons are positioned radially respective to a common axial centerline that coincides with the longitudinal axial centerline of the pipe section. The pistons have hard surface material on the outer face thereof. Each piston receiving chamber in the mandrel is connected to a common source of pressure so that a variable chamber is provided. The grinderhead apparatus is rotatably and slidably received in a reciprocating and telescoping manner within the pipe section to remove some of the material forming the inside surface thereof.

The plurality of pistons which are reciprocatingly received within the piston receiving chambers can be extended with equal force into contact with the inner wall surface of the pipe, where the outer face of the pistons engages the inner pipe wall surface and thereby removes material from the inner pipe surface as the grinderhead is rotated and moved axially within the pipe. The inner wall surface can be metal or plastic.

In one embodiment of the invention, a cutterhead is included that has a plurality of cutters. A plurality of circumferentially spaced radially adjustable cutting elements are adjustably received within a main body of each cutter by which the effective diameter of the cutterhead is selected, thereby enabling removal of sufficient plastic material from the inside wall of the pipe to provide a predetermined minimum pipe diameter. The cutterhead removes the plastic coating from the interior of the pipe and is followed by the grinderhead apparatus which removes metal from the inner surface of the pipe to complete the operation.

The grinderhead, with or without the cutterhead of this invention, is used in conjunction with a system that includes a power shaft connected to rotate and axially move the mandrel. The grinderhead has a longitudinally extending axial passageway which delivers cutting fluid to the grinder and cutting device. The fluid returns back down through the pipe that is being processed, carrying the removed cuttings therewith. The system includes apparatus for rotating the power shaft and apparatus for moving the shaft along its longitudinal axis.

A primary object of the present invention is the provision of a grinderhead for grinding the interior of a pipe and having radially active, spaced alignment and grinding means for rotatably engaging the inner peripheral wall surface of a pipe as the rotating grinderhead is moved longitudinally along the pipe interior.

Another object of the present invention is the provision of method and apparatus for drifting a pipe section by utilizing a grinder device which engages the inner peripheral wall surface of a joint of pipe and removes material therefrom to thereby provide a constant diameter pipe.

A further object of this invention is the provision of a grinderhead for preparing pipe sections for plastic coating. The grinderhead includes alignment and grinding means having radially active pistons that are subjected to an equal force for extending the pistons and thereby positioning the axis of the rotatable grinderhead respective to the central axis of the pipe.

An additional object of this invention is the provision of a combination grinderhead and cutterhead for removing a coating from a pipe, and thereafter cleaning and drifting the interior of the pipe, wherein spaced alignment and grinding means are reciprocatingly received within complementary fabricated cylinders, and wherein means are provided by which the cylinders are subjected to equal pressure to thereby equally force the grinding means into engagement with the inner pipe wall.

An additional object of this invention is the provision of a method of removing irregularities from the inside surface of a plastic or metal pipe in order to improve the constant inside diameter thereof by the provision of apparatus that includes a grinderhead that has alignment members in the form of fluid actuated pistons that include a grinding member mounted thereon for engaging and grinding the inside diameter of pipe.

A further object of this invention is the provision of a grinderhead having a cutting apparatus associated therewith for removing irregularities from the inside of tubular sections of metal casing, whereby the casing can be imparted with a minimum size inside diameter. The grinderhead includes spaced alignment means, each having radially active pistons extended with equal force into engagement with the interior wall surface of the casing for positioning the axis of the rotatable grinder apparatus respective to the central axis of the casing. The pistons have grinder members attached to an outer face thereof.

A further object of this invention is the provision of a pipe grinding device for removing irregularities from the inside of tubular sections of plastic coated metal pipe to prepare the pipe for a coating process, whereby the pipe can be imparted with a clean inner surface of a minimum size inside diameter. The grinding device includes radially active piston and alignment means that are extended with equal force into engagement with the interior wall surface of the pipe for positioning the axis of the apparatus along the central axis of the pipe.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 3 is an enlarged, detailed, part dissembled, part cross-sectional, side elevational view taken along line 3—3 of FIG. 6 and showing another embodiment of the apparatus disclosed in FIG. 2;

DETAILED DESCRIPTION OF THE PREFERRED EMBODIMENT

Figure 1:
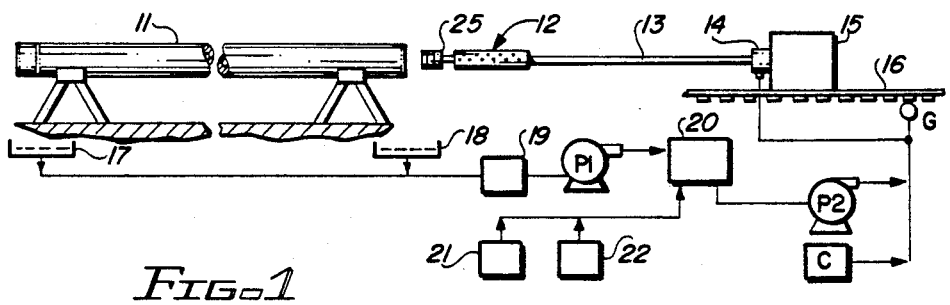
FIG. 1 is a part schematical, part diagrammatical, broken, side elevational view of apparatus and method according to the present invention.

FIG. 1, together with other figures of the drawings, discloses a system 10 for removing irregularities from the inside surface of a pipe 11, and especially for removing a plastic coating along with any interior pipe surface irregularities in order to smooth out, clean, and properly prepare the inner surface of the pipe for a plastic coating process, and especially a powder coating process.

A grinderhead 12, made in accordance with the present invention, is arranged to be extended into the interior of pipe 11 and is removably connected to a power shaft 13. The power shaft 13 is rotated by a swivel 14 (rotating coupling) which in turn is rotated by a prime mover in the form of any type motor 15. The motor 15 is moved along track 16 to move shaft 13 and grinderhead 12 along the longitudinal central axis of pipe 11.

Fluid collectors 17 and 18 collect returned cutting fluid from opposed ends of pipe 11. The fluid collectors 17 and 18 are in the form of pans having a screen for separating fluid from the removed cuttings so that the fluid can then flow to filter 19 where pump P1 transfers the used fluid to accumulator 20. Make-up fluid 21 and 22 is added to accumulator 20 to maintain a suitable liquid level therein. Pump P2 elevates the pressure of the fluid flowing to swivel 14 of the system 10. The fluid pressure is maintained at a predetermined level by regulator G. Numeral C indicates an air compressor for providing suitable air pressure which can be used in lieu of the liquid. Liquid coolant from P2, air from C, either or both can be used jointly or severally.

Figure 2:
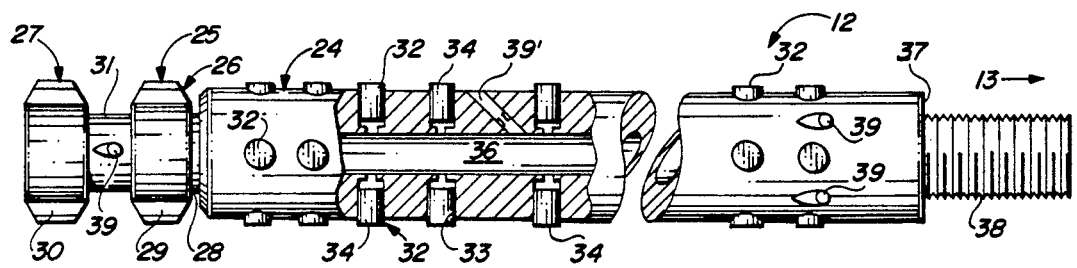
FIG. 2 is an enlarged broken, side elevational, part cross-sectional view of a grinderhead apparatus made in accordance with this invention.

In FIG. 2, the grinderhead 12 is provided with a main body in the form of a mandrel 24 to which there is attached a cutterhead 25 at the far end thereof. The cutterhead 25 includes a pair of axially aligned cutters 26 and 27, there being a near cutter 26 and a far cutter 27. The cutters may be separable or affixed to one another and to the mandrel 24.

The cutterhead preferably is attached by means of suitable fastener means to the grinderhead 12 at reduced diameter part 28. A plurality of circumferentially arranged cutter blades 29 and 30, respectively, radiate from the near and far cutters 26 and 27, respectively. The cutters 26 and 27 are connected by reduced diameter shaft 31 and jointly or severally can be removed from mandrel 24 of the grinderhead 12.

A plurality of piston members 32 are circumferentially disposed about mandrel 24. The piston members 32 form combination alignment and grinding members and are reciprocatingly received within a complementary configured cylinder 33 formed radially within the mandrel 24, and in a manner to expose a radially active piston face 34 having hard material thereon of a composition that removes metal from the interior of a pipe. Numeral 35 indicates a reduced diameter inlet port leading into a variable piston chamber formed below each of the pistons and within each of the cylinders 33.

In the specific embodiment illustrated in FIGS. 3-8, and in particular in FIG. 3, an axial passageway 36 extends from threaded inlet 38, axially through the mandrel of the grinding tool, and into an axial passageway formed within the cutterhead 25, to thereby provide a supply of working and cooling fluid to each of the variable piston chambers of the cylinders and to each of the cutters 26, 27. A plurality of nozzles 39, 39' are strategically located along the length of grinderhead 12 to direct cooling and cutting fluid onto the combination alignment and grinder radial active piston members 32 and onto the cutter blades 29 and 30.

As particularly seen in FIG. 3, mandrel 24 has an inner shoulder 37 against which a removable cap 40 abuts. Cap 40 is threadedly affixed at 41 to the mandrel, which includes a threaded inlet 38 for attachment to shaft 13 of FIG. 1. A similar cap 42 is removably attached at the far end of mandrel 24 by means of the co-acting threaded surfaces at 43. The end 44 o cap 40 forms a lip that is spaced from the outer surface of mandrel 24 to form annulus 46. The annulus 46 extends from end 44 to the threaded surface 41 that terminates at shoulder 37.

The interior wall surface of passageway 36 is seen at 45. Mandrel 24 has a longitudinal axial centerline 47. A plurality of keepers 50 each have opposed marginal ends with one marginal end 48 thereof being received within annulus 46. End 52 of cap 42 similarly forms annulus 54 within which the opposed end 56 of keeper 50 is captured. Ports 58 are spaced apart and are formed diametrically through keeper 50 and register with piston members 32 that are reciprocatingly and slidably received therein.

Each piston member 32 forms a combination alignment and grinding apparatus and has a reduced diameter outer marginal end portion 60 which enlarges to form the illustrated spaced shoulders 62, 64 that provide a o-ring groove 66 therebetween, within which o-ring 68 is received to thereby seal the piston respective to the coacting piston receiving cylinders 33. The face found at the free end of each piston member 32 is provided with hard material 70, such as carbide or micro-crystalline diamond cutting material, to thereby enable the piston face to remove or grind away some of the interior surface of a metal pipe. The button can be used for the hard material 70 which is received within cavity 72 to form the hard surface of the outer piston face. The outer surface 75 of mandrel 24 is milled flat, as seen at 74, to provide a flat surface for receiving keeper 50 closely thereagainst.

The cutters 26, 27 are spaced from one another and from cap 42 as indicated by numerals 76 and 78. Numeral 80 indicates the near cutter body while numeral 84 indicates the far cutter body. Fasteners 82 and 86 adjustably affix cutter blades 29, 30 within their respective slots of the appropriate cutter bodies. Flow passageway 87 communicates with passageway 36 to supply nozzles 39, 39' with a suitable fluid.

The cutterhead 25 can be of unitary construction, including a pin end having threaded surface 88 that mates with a complementary threaded bore formed in the far end 53 of mandrel 24. Alternatively, cutters 26, 27 can be held to mandrel 24 by means of a bolt 51 that extends through passageway 87 along the axis of centerline 47 thereof. In any event, an axial passageway 36 and 87 must be formed through either the pin or the bolt to provide a source of fluid from passageway 36 to the nozzles 39, 39' when the cutter is affixed to the mandrel.

Cap 42 has an inner shoulder that abuts the far end of mandrel 24 at 79. Threads 88 of member 28 and cap 42 can be eliminated, if desired, noting that bolt 51 threadedly engages mandrel 24 at 53. The threaded surface 88 can be made integral with part 28 of cutterhead 25, if desired, to eliminate the necessity of the bolt. The cutterhead 25 would then have the dual function of also serving as a stop nut to maintain the co-acting parts in assembled relationship respective to one another.

In operation, the pipe to be processed is aligned with the grinderhead, with the cutterhead apparatus optionally attached thereto. The prime mover rotates shaft 13 that is attached to mandrel 24 at near end or threaded inlet 38, while the grinderhead and shaft is moved axially by movement of motor 15 along track 16. Fluid flow is effected along the path P2, 14, 13, and into axial passageway 36 to provide flow to nozzles 39, 39' and to provide a pressure drop across the pistons of a magnitude to force the pistons radially outward into contact with the inner surface of the pipe wall with a force that removes material from the surface thereof.

The rotating mandrel removes material from the inside wall of a pipe, whether the pipe is metal, plastic, or plastic coated, as the grinding tool apparatus is rotated and reciprocated within the pipe section. During this time, the pressure at G is of a value to provide fluid flow across the orifice in the passageway of nozzles 39, 39' and to simultaneously extend the faces of all of the combination alignment and grinding piston members 32 into engagement with the interior wall of the pipe section. This action aligns the longitudinal axis of the mandrel along the longitudinal axis of the pipe and thereby concurrently removes material therefrom as the grinding apparatus is rotated and reciprocated through the pipe section. This action results in a clean inner surface that is dimensionally true in diameter and therefore the pipe is drifted.

The material removed from the inner surface of the pipe is conveyed into the containers of the fluid collectors 17, 18 by the spent cutting fluid flowing from the pipe ends. The used fluid continues to filter apparatus 19 where sump pump P1 returns the reclaimed fluid to accumulator 20 for reuse. The removed material resulting from the cutting and grinding operation is periodically removed from the pans at 17, 18 and delivered to a recycling plant.

Where pipe 11 is metal, often it can be drifted by removing cutterhead 25 and plugging the end at 89 with a suitable bolt that is substituted for the cutterhead. The substituted bolt engages the threaded surface of the far end of the mandrel at 53. In many instances, where plastic coated pipe is to be cleaned down to the metal surface, this configuration also advantageously removes the plastic coating from the pipe interior.

It is preferred to adjust cutter blades 29, 30 of cutters 26, 27 such that they are extended radially to remove most of the plastic coating, which usually is only a few thousands of an inch in thickness, and to rely upon the grinding action of the radially active grinding and alignment devices in the form of piston members 32 for removing most of the metal from the interior of the pipe surface. This adjustment of the apparatus usually results in a small amount of the metal being removed by the cutterhead and a large amount of the metal being removed by the radially active grinding and alignment piston members 32.

The cutters 26, 27 of cutterhead 25 have cutter blades 29, 30 arranged in staggered relationship respective to one another as seen in the illustration of FIGS. 7 and 8; wherein elements 29 are 120 degrees apart respective to one another while cutter blades 29 and 30 are 60 degrees apart respective to one another and thereby add significantly to maintaining both cutterhead 25 and grinderhead 12 axially aligned along the longitudinal axial centerline 47 of the apparatus and the pipe section.

Figure 4:
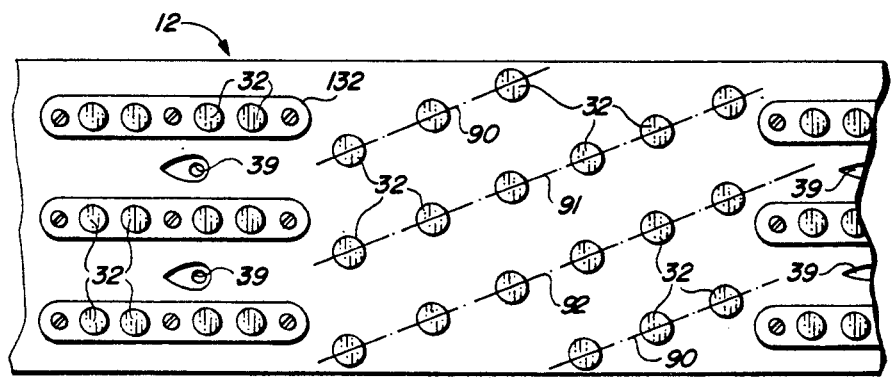
FIG. 4 is a part schematical, part diagrammatical, hypothetical broken view that illustrates the arrangement of some of the parts on the exterior surface of a tool made in accordance with another embodiment of this invention.
Figure 5:
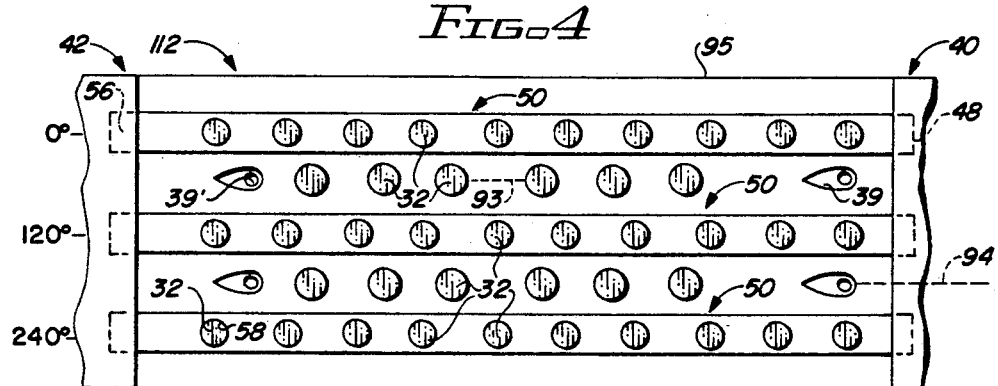
FIG. 5 is a part schematical, part diagrammatical, hypothetical view that illustrates the arrangement of some of the parts on the exterior surface of a tool made in accordance with still another embodiment of this invention; and, FIGS. 6, 7, and 8, respectively, are cross-sectional views taken along lines 6—6, 7—7 and 8—8, respectively, of FIG. 3.

In FIGS. 4 and 5, the arrangement of the components of the apparatus of this invention on the outer surface of mandrel 24 is illustrated as two of the preferred embodiments of grinderhead 12 and 112, of the invention. FIG. 4 more clearly shows the orientation of nozzles 39, 39' and the combination grinding and alignment piston members 32. Groups of the radially active combination grinding and alignment piston members 32 are arranged at 132, and are circumferentially spaced about the mandrel; while other groups of the combination grinding and alignment piston members 32 are arranged along oblique line 90, 91, 92 and circumferentially spaced about the mandrel. Line 90 is twice shown in the hypothetical illustration of FIG. 4 showing that the surface of the mandrel is round, as shown in FIGS. 1, 3, and 6, and not flat as shown, and therefore 360 degrees is represented by the vertical distance between the upper numeral 90 and the lower numeral 90.

In FIG. 5, the embodiment 112 shows the orientation of nozzles 39, 39' respective to the combination grinding and alignment piston members 32. Groups of the combination grinding and alignment piston members 32 are arranged longitudinally along the keepers 50 which are parallel and circumferentially spaced about the mandrel; while other groups of the combination grinding and alignment piston members 32 are arranged along parallel spaced lines 94 and circumferentially spaced about the mandrel, alternating with the combination grinding and alignment piston members 32 of the keepers. Line 95 is twice shown in the hypothetical illustration of FIG. 5, showing that the surface of the mandrel is round, not flat as shown, and therefore 360 degrees is represented by the vertical distance from the upper line 95 to the lower line 95.

The opposed marginal ends 48 and 56 of keeper 50 are received under the confronting lips at cap end 44 and 52, of opposed caps 40 and 42, which makes the apparatus of this invention simple to disassemble and very unlikely ever to inadvertently become disassembled during operation.

The purpose of keeper 50 is to provide a means for retaining the individual pistons captured within the piston receiving cylinders of the mandrel so that the piston face is more easily positioned within the next pipe section to be processed by this invention.

The embodiment of FIG. 2 discloses no specific means for this important feature of the invention.

I claim:

1. Method of removing material from the interior of a pipe section, comprising the steps of:

forming an axial passageway through a main body to provide an annular mandrel; connecting one end of said mandrel to a rotatable shaft which can be moved axially along the interior of the pipe section, thereby moving the mandrel therewith;

forming a plurality of piston receiving cylinders in said mandrel and radially aligning the piston receiving cylinders respective to the longitudinal axis of the mandrel; and, reciprocatingly receiving a radially active piston within each said piston receiving cylinder; moving each said radially active piston in response to fluid pressure effected within the axial passageway by connecting said plurality of piston receiving cylinders to a common source of pressure to concurrently extend a face of the radially active piston of each piston receiving cylinder into contact with the interior wall surface of the pipe section to engage the interior wall surface of the pipe with an outer face of each of said radially active pistons and thereby remove material from the interior wall surface of the pipe section while the mandrel is being rotated by the shaft and moved axially within the pipe section; whereby;

the mandrel moves axially through the pipe section to cut the interior wall surface along the length of the pipe section with the piston faces and thereby remove material from the interior of the pipe section until the pipe section is provided with a minimum inside diameter.

2. The method of claim 1 wherein plastic coating material is removed from the interior of the pipe, and further including the steps of:

aligning a central axis of the pistons radially respective to the longitudinal axis of said mandrel; and providing the outer face of said radially active pistons with a micro crystalline diamond cutting material for removing material from the inner surface of the pipe.

3. The method of claim 1 and further including the steps of:

applying to the outer face of said radially active pistons a hard surface material for removing material from the interior surface of the pipe, and extending the radially active pistons outwardly in order to extend the hard surface material into engagement with the interior wall surface of the pipe.

4. The method of claim 1 and further including the steps of:

connecting said radially active pistons to the common source of pressure to extend said radially active pistons with equal radial force and thereby align the axis of the mandrel with the axis of the pipe section;

connecting a cutterhead to the end of the mandrel that is opposed to the shaft and engaging and removing material from the inner wall surface of the pipe section with said cutterhead and grinding the resultant interior wall surface with the radially active pistons.

5. The method of claim 1 wherein the pipe section is metal and has a plastic coating applied to the interior wall surface thereof; and further including the steps of:

connecting said radially active pistons to the common source of pressure to extend said radially active pistons against the interior wall surface of the pipe section with equal radial force;

connecting a cutterhead to an end of the mandrel that is opposed to the shaft and engaging and removing the plastic coating from the interior wall surface of the pipe section with said cutterhead and grinding the resultant wall surface with the radially active pistons.

6. The method of removing a plastic coating from the inside surface of a pipe section, comprising the steps of:

arranging a grinderhead having a mandrel axially aligned respective to the pipe section;

mounting the mandrel to a rotatable shaft that can be moved axially along the interior of the pipe section by connecting one end of the mandrel to one end of the shaft;

forming a plurality of piston receiving cylinders in said mandrel in spaced relationship respective to one another;

reciprocatingly receiving a radially active piston within each of the piston receiving cylinders to be moved radially respective to the mandrel;

reciprocating and rotating the grinderhead through the interior of the pipe section by reciprocating and rotating the shaft;

connecting the piston receiving cylinders to a common source of pressure and thereby effect a pressure drop across each of the radially active pistons of a magnitude to extend the outer face of the pistons into contact with the interior wall surface of the pipe section, thereby removing material from the interior wall surface of the pipe section during rotation of said grinderhead while permitting said grinderhead to be moved axially within the pipe section and thereby provide the pipe section with a minimum inside diameter.

7. The method of claim 6 and further including the steps of connecting a cutterhead to the grinderhead and using the cutterhead to remove a plastic coating from the interior wall surface of the pipe section while the grinderhead is used to remove metal from the interior wall surface o the pipe section, thereby presenting a clean metal surface to which a new plastic coating can be bonded.

8. The method of claim 7 and further including the steps of connecting at least three radially active pistons having a variable fluid chamber connected to a common passageway;

elevating the pressure within each variable fluid chamber to a predetermined pressure to align the mandrel along the longitudinal axis of the pipe section.

9. The method of claim 8 wherein said mandrel is hollow and further including the steps of conducting cutting fluid therethrough, and forming a flow passageway to a nozzle arranged to spray cutting fluid onto the outer face of the pistons of the grinderhead; and connecting a hollow shaft means to rotate said mandrel, and flowing cutting fluid into the shaft, into the mandrel, and to said outer face of the pistons.

10. The method of claim 7 and further including the steps of affixing said cutterhead directly to said mandrel and arranging a plurality of radially arranged cutting elements for engaging and cutting the interior of the pipe section in advance of the metal removing action of the piston faces.

11. A system for removing material from the inner surface of a pipe section, comprising a rotatable hollow shaft, means for releasably securing a pipe section in axially aligned relationship about said hollow shaft, means for rotating said hollow shaft and for moving said hollow shaft along the longitudinal axis thereof to reciprocate the free end of the hollow shaft respective to the pipe section;

a grinderhead for removing material from the inner surface of a pipe section, said grinderhead including a plurality of alignment and grinder devices for removing material from the inner surface of the pipe section and thereby provide the pipe section with a clean interior having a minimum inside diameter, said grinderhead has a mandrel adapted to be connected to said rotatable hollow shaft and adapted to be moved axially along the interior of the pipe section while being rotated by the hollow shaft;

the alignment and grinder devices are spaced from one another and mounted circumferentially about a common axial center line of said mandrel; a grinding element on each said alignment and grinder device;

each said alignment and grinder device comprises a cylinder that is radially aligned respective to the longitudinal axis of the mandrel and is circumferentially arranged about the mandrel; a radially active piston received within each cylinder, said grinding element includes grinding means on each said radially active piston for engaging the inner surface of the pipe section; means connecting each cylinder to a common source of pressure which extends the face of each said radially active piston into contact with the inner surface of the pipe section with equal force;

passageway means for flowing fluid through said shaft, mandrel, and to the cylinder to provide said source of pressure.

12. The system of claim 11 and further including a cutterhead removably attached to the far end of the mandrel; a central axis of the piston is arranged radially respective to the longitudinal axis of said mandrel; each said radially active piston has a configuration that corresponds to the configuration of the cylinders.

13. The system of claim 11 wherein said passageway means conducts cutting fluid to the grinders of the grinderhead by means of radial passageways that communicate a nozzle with the interior of the mandrel;

said grinderhead includes a first plurality of radially arranged pistons and cylinders spaced from a second and a third plurality of radially arranged pistons and cylinders for engaging and cutting the interior surface from the inside of the pipe.

14. The system of claim 11 wherein there are a plurality of groups of pistons and cylinders with each radially active piston having a working chamber subjected to a pressure to align the mandrel with the axis of the pipe; and means for supplying pressure to each said working chamber from said common source of pressure.

15. Apparatus for removing irregularities from the inside of a pipe section to thereby drift the pipe while at the same time preparing the interior surface of pipe for a coating process, said apparatus includes a grinderhead for removing the inner wall surface along the length of a pipe section and thereby provide the pipe section with a minimum inside diameter;

said apparatus includes a mandrel, said mandrel has an end which is adapted to be connected to a rotatable hollow shaft which can be moved axially along the interior of the pipe section while rotating;

means forming a plurality of piston receiving cylinders in said mandrel, a piston means that forms a radially active combination grinding member and alignment device for each cylinder;

each of said plurality of piston receiving cylinders and said piston means jointly forming a variable chamber therebetween within said mandrel; said piston means are radially active and are reciprocatingly received within said piston receiving chambers and have a piston face that can be extended into contact with the inner wall surface of the pipe section; means maintaining an elevated pressure against each of said radially active pistons to extend the piston towards the inner pipe wall, and;

grinding material on each said piston face for engaging the inner wall of the pipe section and removing material from the pipe interior and thereby provide the pipe section with a minimum inside diameter.

16. The apparatus of claim 15 wherein there are at least three radially active pistons having said piston chamber connected to a common passageway that is inflatable to a predetermined pressure to align the mandrel with respect to the longitudinal axis of the pipe section.

17. The apparatus of claim 16 wherein said mandrel is hollow and conducts cutting fluid therethrough, said grinding member and alignment device has means forming a passageway to the grinding material on each of the pistons.

18. The apparatus of claim 17 wherein said grinderhead has at least three radially active pistons, said mandrel having means forming a chamber therein which is elevated to a pressure to align the mandrel with the axis of the pipe;

a plurality of pistons and cylinders for each said radially active grinding member and alignment device; said mandrel is hollow and includes passageway means which conduct cutting fluid to the grinding material of the grinderhead.

19. The apparatus of claim 15 wherein said grinderhead is directly affixed to said mandrel and includes a plurality of radially arranged grinder members adjustably positioned thereon for engaging and cutting the interior of the pipe section.

* * * * *